Patented Feb. 14, 1950

2,497,150

UNITED STATES PATENT OFFICE 2,497,150

PROCESS FOR THE CONTROL OF FOAMING

Carl S. Carlson, Elizabeth, and Howard T. Oakley, Jersey City, N. J., assignors to Standard Oil Development Company, a corporation of Delaware No Drawing. Application August 23, 1946, Serial No. 692,706

2 Claims. (Cl. 260—657)

This invention relates to a process for the control of foaming.

Foaming of solutions in reactors, evaporators, and the like, is the cause of decreased equipment capacity, as it requires equipment having greater volume, etc. Foaming in distillation systems results in a loss of efficiency in the system and usually in decreased capacity.

An object of this invention is to remove foam-inducing impurities from a system prone to foam.

Another object of this invention is to permit a small amount of foaming-over in a system whereby foam-inducing impurities in the system are substantially removed.

Still another object of this invention is to promote a small amount of foaming-over in a system prone to foam by the addition of a surface active material, thereby removing foam-inducing impurities.

Another and further object of this invention is to prevent foaming in a system prone to foam by the addition of a small amount of a surface active agent, whereby foaming is inhibited, until foam-inducing impurities are accumulated to a troublesome degree, and then to promote foaming-over by the addition of a larger amount of surface active material whereby foam-inducing materials are removed from the system.

Other objects and a fuller understanding of the invention may be had by referring to the following description and claims.

It has been discovered that by removing a substantial amount of the foam from a system which shows a tendency to foam during the course of its operation, that foaming in such a system is inhibited and ceases to be a troublesome feature and a deterrent to efficient operation of the system at normal capacity. Foaming in a system which is prone to foam occurs ordinarily after an initial period in which foaming is not a major problem; this is probably due to the formation during the initial period, of foam-inducing substances. Foam-inducing substances may be soluble or insoluble materials such as polymers and so forth, which are generally large molecules and which upon continuous operation of the system, particularly when the system is heated, may be carbonized to result in finely divided insoluble particles which are highly conducent to foaming. When these insoluble or soluble particles which induce foam have accumulated in the system to an appreciable amount, foaming results which is so serious that the capacity of equipment is reduced. By removing at this point, a substantial amount of the foam, enough of the soluble or insoluble foam-inducing substances are removed to enable the system to operate at normal capacity. It is contemplated in this invention to provide means in such a system whereby the system may be allowed to foam over and whereby foam may be removed from the system. It is contemplated that the system may be operated until the foaming-over occurs and the foam is removed from the system or that a surface active material which induces foaming may be added to the system at any time after operation has started and after the foam-inducing substances in the system have accumulated, whereby substantial foaming is induced and results in foam being carried out of the system.

It is also contemplated in this invention that a surface active material may be added to a system which is prone to foam in order that foam may be inhibited until the foam-inducing substances, which are produced in the system, have reached such a concentration that it is desirable that they be removed. At this point, an additional amount of surface active material, large enough to induce foaming, may be added in order that foaming-over may occur and the foam-inducing impurities be removed from the system.

Surface active materials, in general, may be used in the practice of this invention; the following have been found particularly advantageous: petroleum sulfonates, salts of alkyl aromatic sulfonic acids, sodium sulfosuccinic esters, quaternary amine salts, polyethers, and long-chain glycols.

The amount of surface active material which is added to a system to inhibit foaming is within the range of from 5 to 25 parts per million of the liquid in the system. The amount of surface active material which is added to induce foaming is within the range of from 100 to 500 parts per million of the liquid in the system.

The amount of liquid in the system removed as foam by allowing or inducing foaming-over is within the range of from 1 to 10% of the total volume of the liquid in the system; the preferred amount is within the range of from 1 to 5%.

The practice of this invention is not to be restricted to any particular means of removing foam from a system in which foaming causes difficulties; the foam may be drawn off from the system at any level at which the foam is present but it is preferred to draw off the foam at the top of the foam level by letting the foam flow out of the system through some such means as an overflow pipe or conduit. The foam which is removed from the system may be allowed to settle and the clear liquid free from any insoluble particles may be returned to the system, however, any other means such as filtration may be used to separate the liquid from any insoluble foam-inducing particles.

The practice of this invention is applicable to any system which is prone to foam and is particularly applicable to the system in which alkyl chlorides are synthesized from hydrogen chloride and an aliphatic alcohol in the presence of an aqueous metal chloride catalyst or an aqueous mixture of metal chlorides and particularly an aqueous metal chloride catalyst such as zinc chloride or zinc chloride in combination with other metal chlorides such as those of the alkali and alkaline earth metals, e. g., calcium chloride, potassium chloride, bismuth chloride, also antimony chloride, stannic chloride and lead chloride. It is also particularly applicable to the system in which a butadiene-cuprous ammonium acetate complex solution is heated to produce butadiene, which has been concentrated by means of the cuprous salt. It may also be used in similar concentration of other conjugated dienes, such as isoprene, the piperylenes, the conjugated hexadienes, etc., by means of cuprous salt complexes.

Example I

Three per cent by volume of the liquid contents was removed, as foam, from a reaction zone in which methyl alcohol and hydrogen chloride were contacted with aqueous zinc chloride at 150° C. for the production of methyl chloride and in which foaming was so bad that the system could not be operated at normal capacity because of the high level of the foam. Foam was allowed to go out of the reaction zone through an opening at the top of the reaction chamber which led to a receptacle in which the foam was caught. 70 cc. of liquid was removed as foam from the reactor and 2100 cc. remained in the reactor. The liquid remaining in the reactor was clear and substantially free from suspended particles or sediment. The level of the foam in the reactor was then low and caused no difficulty in operating the system at normal capacity.

Example II

Two liters of 60% zinc chloride solution was withdrawn from a reactor in which the reaction described in Example I was being conducted and was agitated in the two liter graduate at room temperature with nitrogen. A foam level of 3 to 4 inches was observed. One drop of lauryl sulfate was added to the graduate which reduced the foam level to a point where it was negligible. Thirty drops of lauryl sulfate were then added to the graduate and this induced foaming to the point where the foam was carried out of the graduate. Although agitation of the liquid remaining in the graduate was continued with nitrogen, foaming then subsided in the graduate to a point where it was negligible.

Example III

Two liters of 60% zinc chloride solution which had been withdrawn from a reactor in which the reaction described in Example I was being run was agitated in a two liter graduate at room temperature with nitrogen. The foam level was 3 to 4 inches above the level of the solution. Thirty drops of lauryl sulfate were added to the solution and this induced foaming to such an extent that foam came over the top of the graduate. Foaming then subsided in the graduate to a point where it was negligible.

From the above exemplary material and description of the invention it will be seen that by the practice of this invention the difficulties encountered as a result of foaming in a system prone to foam are obviated and operation of such a system may then be conducted without encountering the difficulties resulting from excessive foaming and at the normal capacity of the system equipment.

As many apparently, widely different embodiments of this invention may be made without departing from the spirit and scope thereof, it is to be understood that the invention is not to be limited to the specific embodiment thereof, in the nature of examples, except as defined in the appended claims.

What is claimed is:

1. A process for controlling spontaneous foaming in a continuously reacting aqueous liquid phase system, wherein an alkyl chloride is prepared from hydrogen chloride and an aliphatic alcohol in the presence of a metal chloride catalyst in aqueous solution during which reaction foam-inducing substances are continuously formed and built up, which comprises an initial step of adding lauryl sulfate to the system in a small amount sufficient to suppress foam formation, whereby foaming is inhibited, followed by a second step during which period the reaction is allowed to proceed and foam-inducing substances continuously form and build up to an undesirable concentration within the aqueous liquid phase reacting system, and a third step of subsequently adding lauryl sulfate to the system in an amount sufficient to positively produce foam therein, and thereafter removing said foam so produced from said system leaving behind a relatively foam-free aqueous liquid phase in which the preparation of the alkyl chloride is continued.

2. A process according to claim 1, in which 5 to 25 parts per million of lauryl sulfate are added to the reacting system in the initial step and 100 to 500 parts per million of lauryl sulfate are added to the system in the third step.

CARL S. CARLSON.
HOWARD T. OAKLEY.

REFERENCES CITED

The following references are of record in the file of this patent:

UNITED STATES PATENTS

| Number | Name | Date |
| --- | --- | --- |
| 1,784,423 | Frei | Dec. 9, 1930 |
| 2,162,379 | Dole et al. | June 13, 1939 |
| 2,345,061 | Miles | Mar. 28, 1944 |
| 2,390,492 | Bennett et al. | Dec. 11, 1945 |
| 2,395,529 | Arnold | Feb. 26, 1946 |
| 2,400,340 | Cone | May 14, 1946 |
| 2,400,376 | Showalter | May 14, 1946 |
| 2,408,527 | Monson | Oct. 1, 1946 |

OTHER REFERENCES

Ross et al., "Industrial and Engineering Chemistry," vol. 36, pages 570–573 (1944).

Atlas Powder Co., "Surface Active Agents," pages 42–3 (1948).